United States Patent [19]

Lundin

[11] 4,432,874
[45] Feb. 21, 1984

[54] COLLECTING ROPE

[76] Inventor: Lars Lundin, Kauppiaankatu 4, SF-06150 Porvoo 15, Finland

[21] Appl. No.: 390,934

[22] Filed: Jun. 22, 1982

[30] Foreign Application Priority Data

Jul. 6, 1981 [FI] Finland ................................ 812122

[51] Int. Cl.³ ............................................. B01D 17/00
[52] U.S. Cl. ................................. 210/242.4; 210/924; 405/63; 464/148; 464/179; 403/224
[58] Field of Search ................ 210/242.2, 242.3, 242.4, 210/922, 923, 924; 405/63–72; 464/148, 179, 181, 183; 403/224, 225, 226

[56] References Cited

U.S. PATENT DOCUMENTS

| | | | |
|---|---|---|---|
| 158,325 | 12/1874 | Starr | 464/181 |
| 1,595,922 | 8/1926 | Prindle | 464/148 |
| 2,200,552 | 5/1940 | Hook | 405/70 |
| 2,228,529 | 1/1941 | Moeller | 405/70 |
| 2,659,619 | 11/1953 | Kishline et al. | 403/225 |
| 3,565,257 | 2/1971 | Cavalieri | 405/63 |
| 3,618,768 | 11/1971 | Brown | 210/923 |
| 3,739,913 | 6/1973 | Bogosian | 210/242.4 |
| 3,881,211 | 5/1975 | Rhodes | 210/924 |
| 4,316,804 | 2/1982 | Bocard et al. | 210/242.4 |
| 4,332,854 | 6/1982 | Parker | 210/924 |

FOREIGN PATENT DOCUMENTS

| | | | |
|---|---|---|---|
| 2339541 | 2/1975 | Fed. Rep. of Germany | 210/924 |
| 2822174 | 11/1979 | Fed. Rep. of Germany | 210/924 |
| 60424 | 11/1981 | Finland | |
| 767980 | 11/1971 | France | 210/924 |
| 811668 | 4/1959 | United Kingdom | 403/225 |

OTHER PUBLICATIONS

*Harbour Boom TM*, pamphlet by Clean Water, Inc., P. O. Box 1002, Toms River, N.J. 08753 (6/20/1973).

*Primary Examiner*—Charles N. Hart
*Assistant Examiner*—John W. Czaja
*Attorney, Agent, or Firm*—Lewis H. Eslinger

[57] ABSTRACT

A collecting rope which is intended especially for collecting oil from the surface of water, the rope comprising a drive chain which is situated inside a cylindrical part, which is surrounded by a lightweight float layer, which is surrounded by another cylindrical part, oil-collecting bristles being attached to the outer surface of the outer cylinder. The cylindrical parts can rotate in relation to the drive chain, since the joint between them consists of resilient protrusions on the inner surface of the inner cylinder. The cylinders and the chain are, however, locked to each other in the longitudinal direction.

13 Claims, 3 Drawing Figures

COLLECTING ROPE

BACKGROUND OF THE INVENTION

1. Field of the Invention

The present invention relates to a collecting rope which is intended for use particularly for collecting of oil or other similar material from the surface of water.

2. Description of the Prior Art

There are numerous types of ropes intended for the collecting of oil or similar material, their most common structural form comprising a substantially unelastic core, which thus acts as the supporting structure of the rope, and over this core a varying number of layers, which usually consist of a material which makes the rope float, and a topmost layer, which has bristle-like thorns or spikes, which do the actual collecting. Sometimes the bristles are attached directly to a supporting cable or the like.

Development of technology has imposed new demands on collecting ropes, and known ropes have not been capable or responding to these demands. In addition, special demands have been set on ropes which operate under difficult conditions run a high risk of breakage. One development of new technology is the rotation of steel ropes about their longitudinal axis in order to improve their collecting efficiency. One such solution is introduced in Finnish Patent Specification No. 60424. Thus, if a steel rope is rotated about its longitudinal axis and the rope is caught on, for example, a rock, it is probable that some part of the apparatus, either the rope or the rotating device, is damaged. This has not been foreseen in prior known solutions.

SUMMARY OF THE INVENTION

The object of the present invention is to provide a collecting rope which can be rotated, if so desired, and in which, when the rope gets caught, the parts involved stop from rotating in order to prevent damage, and after possible damage, the rope can easily be brought into operating condition at low cost so that the entire rope need not be transported to the factory for repairs or be entirely replaced. In addition, the object is to provide a new, inexpensive, simple and effective structure for use under any conditions.

It should be noted that the terms "rope" and "bristle" used in this Application must not be interpreted narrowly. "Rope" is used in this connection to denote a long piece, without thereby limiting in any way its shape or thickness, and "bristle" denotes any known structure, from pile to spikes, capable of collecting oil or similar material.

BRIEF DESCRIPTION OF THE DRAWINGS

The invention is described below in greater detail with reference to the accompanying drawings, in which.

DESCRIPTION OF THE PREFERRED EMBODIMENTS

Figure 1:
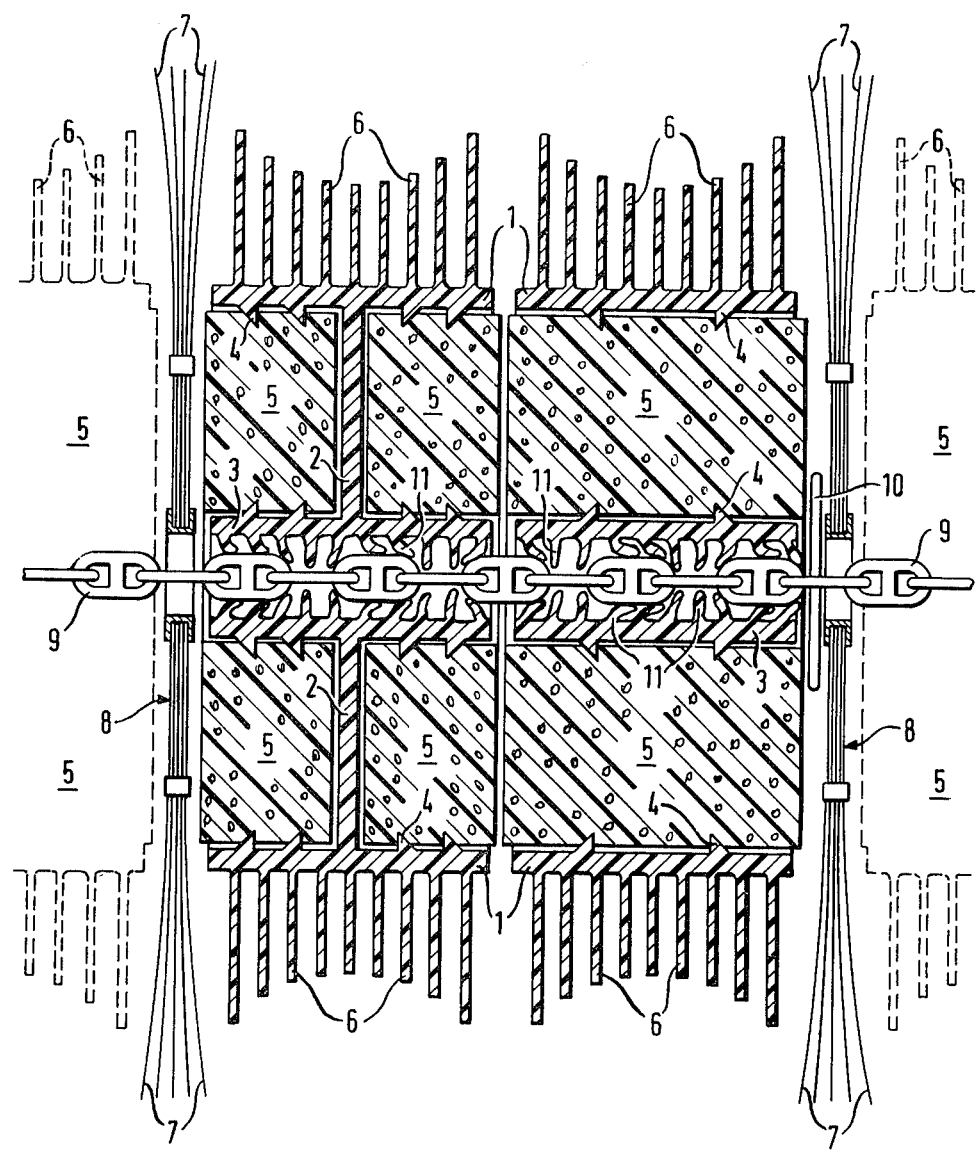
FIG. 1 is a longitudinal sectional representation of a rope according to the invention.

The rope according to the invention as shown in FIG. 1 consists of the following parts: The core of the rope structure is a part which consists of an outer cylinder 1 and an inner cylinder 3, which are interconnected by means of a disc 2 to form a substantially rigid entity. The length of the double cylinder described is perhaps one-half the diameter of its outer cylinder. On the outer surface of the outer cylinder there are bristles 6, which are preferably of the same material as the cylinder itself, and in this case attached to the cylinder by means of, for example, fusion. On the other hand, the bristles or spikes can be attached to, for example, a separate "sock", which is pulled over the outer cylinder, in which case the spikes protrude substantially straight outwards. For example, polyethylene or polypropylene are suitable for use as the material of the cylinders and also the spikes. The space, indicated by 5, between the cylinders is filled with a material the purpose of which is to float the rope to the desired extent on the surface of water. Closed-cell foam plastics are suitable for this purpose. The foam plastic is installed in place in the form of pre-shaped dics, which substantially fill the intermediate space 5. To ensure attachment, barbs 4 can be used on the inner surface of the outer cylinder and on the outer surface of the inner cylinder. By means of the float layer 5 it is possible, when necessary, to attach the cylinders 1 and 3 to each other even without an intermediate disc 2.

Since the purpose is to rotate the chain in order to rotate the entire rope, the inside of the inner cylinder is provided with spike-like protrusions 11, the purpose of which is to produce a resilient joint in case the rope cannot rotate at that point because of, for example, being caught on a rock. In other words, only that cylinder unit which has been caught stops from rotating, while the other parts of the rope continue their rotation quite normally.

The placement of the above-described friction joint, which yields when necessary, inside the inner cylinder is by no means necessary. A similar effect can be produced by, for example, connecting to the stoppers 10, and to the intermediate pieces of material 5 adjacent to them, friction surfaces which keep the cylindrical parts moving together until the section is caught or something similar occurs. Undoubtedly, experts in the art will automatically come up with even other suitable solutions.

Figure 2:
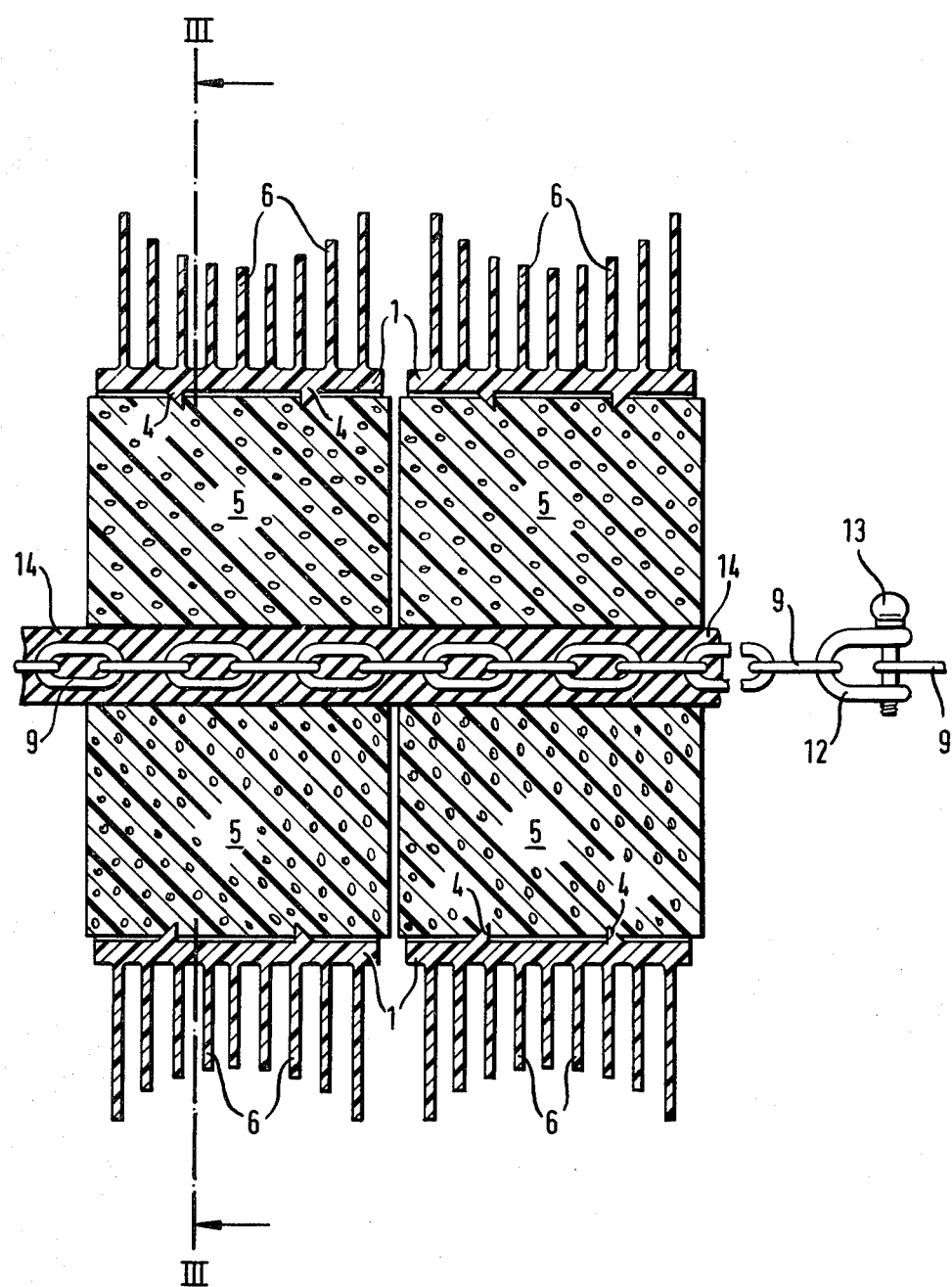
FIG. 2 is a similar sectional representation of a simplified embodiment of the rope according to the invention.
Figure 3:
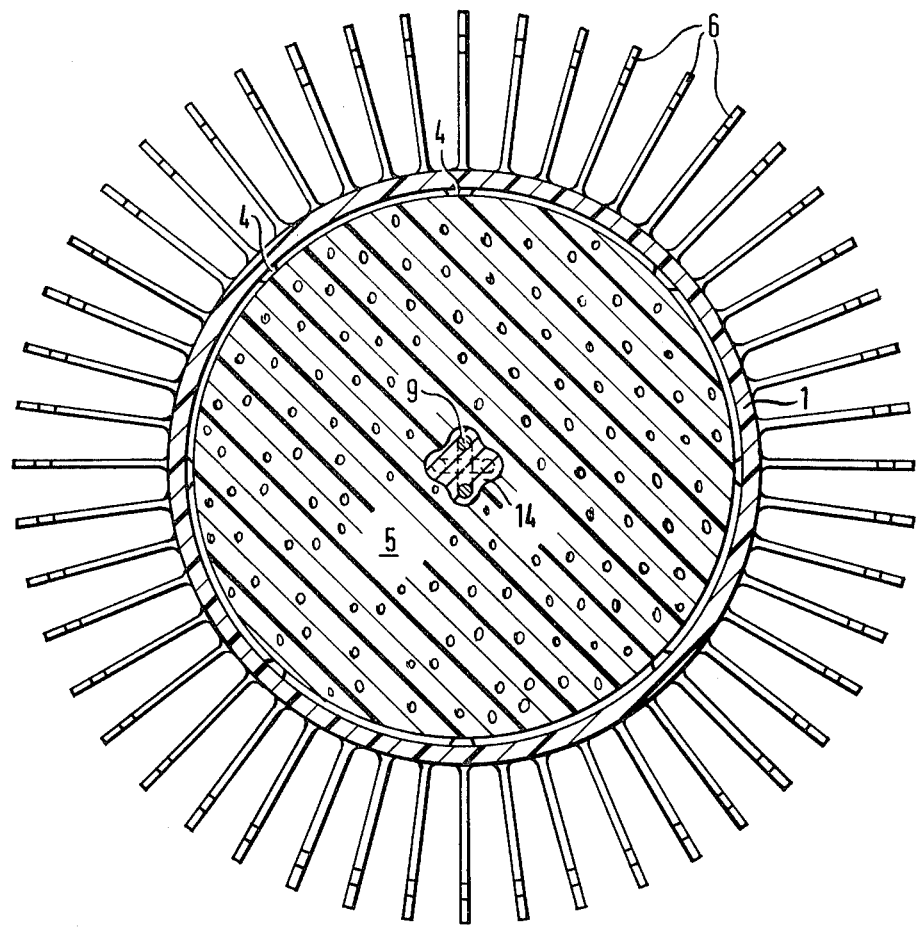
FIG. 3 depicts cross section III—III of the rope according to FIG. 2.

It is possible to use another, even simpler embodiment of the rope in question. It differs from that described above in that it has no inner cylinder. Such a rope is depicted in FIGS. 2 and 3, and owing to its simplicity it is to be considered the preferred embodiment. In the float layer material a hole is made, through which a chain 9 is passed, whereby a naturally suitable friction joint is created between the chain and the float material, without any extra protrusions. This sets considerable demands on the material, also regarding its resistance to wear, since the material must endure also the strains caused by the chain. Several such polymer types, highly resistant to wear, are known among ordinary commercial brands.

The collecting rope of FIG. 2 is thus composed of a cylindrical part 1, to which the bristles 6 which collect oil or the like are attached. Inside the cylinder there is a float layer 5, which substantially fits inside the cylinder and in the center of which there is a bore into which a chain or some other suitable supporting and drive member 9 has been fitted. Over the chain or the like there is preferably, as shown in FIG. 3, vulcanized, or fitted in some other suitable manner, a layer 14 of, for example, plastic or rubber. Such a layer has been found to be advantageous for several reasons. First, the said layer 14 protects the float layer because the edges of the chain are thus rounded and, furthermore, two materials of almost the same type come against each other and thus their adherence to each other for rotation, as well as their durability, is good. If a chain is involved, the surface layer 14 improves its properties in that the shortening of the chain, which is due to a new position of the links in relation to each other, is very slight during the rotating.

The chain 9 is made up of links of the desired type, in which case an ordinary closed-link chain is entirely suitable for the purpose, but its variants such as a chain the links of which are pressed almost together in the middle so that the adjoining links cannot move in the longitudinal direction are also equally suitable for the purpose. The chain is also made up of rather short sections in such a manner that it can be divided, whereupon the replacement of broken links is rapid and easy. In such a case the joint is opened and as many links are removed as necessary for access to the broken link, and the unbroken links, together with the link replacing the broken link, are replaced, whereafter the joint is closed. The rope is again fully usable. The chain joint can be made by means of any coupling known in the art, such as a shackle, which is appropriate in its simplicity. The possibility of dividing the chain can be arranged, when necessary, even in each joint between the links of the rope, although about every tenth or twentieth joint, or an even greater interval, is a more common alternative owing to the low frequency of divisions.

To illustrate the size of the rope, it can be noted by way of example that the diameter of each section is typically about 100 mm and the length of the section about 50 mm. Of course, deviations in either direction are possible, according to the purpose of use. It is, however, highly improbable that the diameter of the sections would exceed 500 mm. A rope of a rather small diameter adapts evenly and precisely to the waves, in which case its usability, for example, on open sea, is excellent compared with ropes previously known in the art. Inability to operate under open-sea conditions has been one of the greatest disadvantages of known structures.

The collecting rope is assembled in such a way that a sufficient number of individual cylinders with their contents are threaded onto a chain 9, at suitable intervals there are placed stoppers 10, which ensure that, when the rope is reeled, not only the chain 9 moves but also the rope material moves along with it. A chain which consists of separate units which can turn in relation to each other has been found to be good, since in that case the rope will press evenly on the water surface and the chain will not produce extra strains in the rope. It has been found in practical experiments that it is advantageous to use occasional clearly longer bristles or spikes. Long bristles are useful for the reason that lumps present in the oil being collected do not easily remain on an even bristle surface, but long bristles will catch them well. In accordance with the invention, this requirement is fulfilled by fitting, between the cylinder units, at suitable intervals, discs 8, which consist of bristles bound together, their outermost ends 7 being free and of such a length that they rise substantially higher from the rope surface than do the bristles 6. On the other hand, a corresponding structure can also be produced by a suitable shaping of the bristles attached to the cylinder 1.

The float material discs 5 come preferably somewhat outside the ends of the cylinders. As a result, the rope is flexible, since the disc material yields and compresses when two adjacent cylinder units turn in relation to each other, as happens when the rope forms a shape deviating from straight. The fact that a relatively soft foam plastic or similar material is against the corresponding part of another unit also protects the long bristles 7 protruding from between the units.

The rope according to the invention is not easily damaged, since it yields when the risk of damage is greatest. The most common reason for damage is the rope being caught on rocks or other obstacles present in shallow water when the operation is carried out near the coast. If, however, there is damage, it very rarely involves very many cylinder units.

What is claimed is:

1. A collecting rope for collecting oil or similar material from the surface of water, the rope comprising:
 a supporting drive chain, and
 a plurality of relatively short, separate flotation units, each flotation unit includes a cylindrical shell to which bristles are attached for collecting oil or similar material from the water's surface and a float layer disposed within said cylindrical shell for floating said shell on the water's surface, wherein said supporting and drive chain connects said flotation units together for rotation thereof by said chain.

2. A rope according to claim 1, in which the chain is of the closed-link type and is covered with a coating which encloses the links.

3. A chain according to claim 2, wherein the coating of the chain comprises of a plastic or rubber material.

4. A rope according to claim 1, wherein the chain is divided into separate sections after about every ten links thereof in order to facilitate the replacement of damaged links.

5. A rope according to claim 4, in which the division of the chain into sections is by a shackle means.

6. A rope according to claim 1, wherein the float layer is situated between said cylindrical shell and a central cylindrical member substantially co-axial with said shell.

7. A rope according to claim 6, wherein the cylindrical shell and member are interconnected by a generally radial disc-like part.

8. A rope according to claim 6, wherein the cylindrical shell and member are interconnected by the float layer.

9. A rope according to any one of claims 1-8, wherein at least in some of the gaps between the flotation units in the longitudinal direction have disposed therein additional bristles which are longer than the bristles attached to the outer cylindrical shell.

10. A rope according to claim 9 in which the cylindrical shell and member and the bristles are made from polyethylene or polypropylene.

11. A rope according to claim 9, in which a stopper is placed in at least some of said gaps for preventing longitudinal movement of the adjacent flotation unit relative to said supporting drive member.

12. A rope according to any one of claims 6-8, in which the inner cylindrical member has a longitudinal passageway therethrough for passage of the supporting drive member, said passageway being provided with resilient protrusions to create a resiliently rotatable joint between the supporting drive member and the cylindrical member.

13. A collecting rope for collecting oil or similar material from the surface of water, the rope comprising:
a plurality of flotation units, each of which includes a cylindrical shell to which bristles are attached for collecting oil or similar material from the water's surface and a float layer secured to said cylindrical shell for floating said shell on the water's surface;
a supporting drive member connecting said flotation units for rotation thereof by rotation of said supporting and drive member; and
means providing a resiliently rotatable joint between said flotation units and said supporting drive member for permitting rotation of said supporting drive member relative to said flotation units.

* * * * *